United States Patent
Wang et al.

(10) Patent No.: US 9,712,562 B2
(45) Date of Patent: Jul. 18, 2017

(54) METHOD, DEVICE AND SYSTEM FOR DETECTING POTENTIAL PHISHING WEBSITES

(71) Applicant: Tencent Technology (Shenzhen) Company Limited, Shenzhen, Guangdong (CN)

(72) Inventors: Jiabin Wang, Guangdong (CN); Fudong Shao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 112 days.

(21) Appl. No.: 14/845,863

(22) Filed: Sep. 4, 2015

(65) Prior Publication Data

US 2015/0381654 A1     Dec. 31, 2015

Related U.S. Application Data

(63) Continuation of application No. PCT/CN2014/081565, filed on Jul. 3, 2014.

(30) Foreign Application Priority Data

Jul. 5, 2013    (CN) .......................... 2013 1 0282029

(51) Int. Cl.
*G06F 21/00*     (2013.01)
*H04L 29/06*     (2006.01)
(Continued)

(52) U.S. Cl.
CPC ........ *H04L 63/1483* (2013.01); *G06F 21/577* (2013.01); *G06F 21/6245* (2013.01);
(Continued)

(58) Field of Classification Search
CPC ..................................................... H04L 63/101
See application file for complete search history.

(56) References Cited

U.S. PATENT DOCUMENTS 7,802,298 B1 * 9/2010 Hong ...................... G06F 21/51
                                                         705/51
8,312,543 B1 * 11/2012 Gardner .............. H04L 63/1416
                                                         726/22
(Continued)

FOREIGN PATENT DOCUMENTS

CN          101183415         5/2008
CN          101924741        12/2010
(Continued)

OTHER PUBLICATIONS

International Search Report and Written Opinion issued in counterpart application PCT/CN2014/081565, dated Oct. 10, 2014, pp. 1-8.
(Continued)

*Primary Examiner* — Morshed Mehedi
(74) *Attorney, Agent, or Firm* — Brinks Gilson & Lione

(57) ABSTRACT

The present disclosure discloses a method and device for detecting a potential phishing website. In the method, a computing device having at least a processor obtains information input to a website and determines whether the website is legitimate through a server when the input information entered by the user has some private information. The computing device continues to access the website if the website is legitimate and generates a warning if the website is determined not to be legitimate.

16 Claims, 12 Drawing Sheets

(51) Int. Cl.
*G06F 21/62* (2013.01)
*G06F 21/57* (2013.01)

(52) U.S. Cl.
CPC ........ *H04L 63/0236* (2013.01); *H04L 63/101* (2013.01); *H04L 63/1408* (2013.01)

(56) References Cited

U.S. PATENT DOCUMENTS

| | | | | |
|---|---|---|---|---|
| 8,321,934 | B1* | 11/2012 | Cooley | G06F 21/56 709/227 |
| 8,776,196 | B1* | 7/2014 | Oliver | H04L 63/1408 726/11 |
| 8,839,369 | B1* | 9/2014 | Dai | H04L 63/10 713/178 |
| 2006/0075028 | A1* | 4/2006 | Zager | G06Q 10/107 709/206 |
| 2008/0141342 | A1* | 6/2008 | Curnyn | H04L 63/0227 726/3 |
| 2009/0300768 | A1* | 12/2009 | Krishnamurthy | G06F 21/552 726/26 |
| 2011/0321139 | A1* | 12/2011 | Jayaraman | G06F 21/51 726/4 |
| 2013/0031628 | A1* | 1/2013 | Wang | G06F 21/56 726/22 |
| 2013/0036468 | A1* | 2/2013 | Georgiev | H04L 61/1511 726/23 |
| 2014/0173726 | A1* | 6/2014 | Varenhorst | H04L 63/1416 726/22 |
| 2015/0200963 | A1* | 7/2015 | Geng | G06F 21/51 726/22 |

FOREIGN PATENT DOCUMENTS

| | | |
|---|---|---|
| CN | 101317376 B | 4/2011 |
| CN | 102299918 | 12/2011 |
| CN | 102891861 | 1/2013 |
| CN | 102930214 | 2/2013 |
| CN | 103368958 | 10/2013 |
| TW | 200632641 A | 9/2006 |
| TW | 201248403 A | 12/2012 |
| WO | 2012/126263 | 9/2012 |

OTHER PUBLICATIONS

Search Report issued in counterpart application CN2013102820299, dated Aug. 26, 2015, pp. 1-7.

* cited by examiner

METHOD, DEVICE AND SYSTEM FOR DETECTING POTENTIAL PHISHING WEBSITES

CROSS-REFERENCE TO RELATED APPLICATIONS

This application is a continuation of PCT/CN2014/081565, filed on Jul. 3, 2014, which claims priority to a Chinese Patent Application No. 201310282029.9, filed on Jul. 5, 2013. The content of these applications is incorporated by reference in their entirety.

FIELD OF THE TECHNOLOGY

The present disclosure relates to network technologies, more particularly to a phishing web page detecting method, device and system.

BACKGROUND

With the development of network technologies, people are more and more concerned about network security, especially protection of users' private information, such as, but not limited to, users' accounts, usernames, credit card numbers, and passwords. Phishing websites attempt to use fraudulent web pages to defraud a user into disclosing private information, such as accounts, usernames, passwords, social security numbers, answers to security questions and the like. Therefore, how to detect a potential phishing webpage is vital to the network safety.

Currently, it is a common approach to install client security software in a user's system in order to detect the websites that the user visits. For example, the websites are first filtered by "whitelists", i.e. those approved or authorized websites. The websites which are not listed in the whitelists will then be sent to a server which checks the websites against the blacklist and whitelist and returns the results to security software. The client security software then determines whether to block the webpages based on the returned results. Those webpages that are neither in the blacklist nor in the whitelist are called "unknown webpages", which are downloaded by the server to check whether the webpages are phishing websites by detecting whether there are certain keywords, such as "XX login," "sign in" and/or "password" and the like, or whether there is a specific input box for account or password on the webpage. If the above-mentioned keywords are detected, the server then checks whether the website is certified or trustworthy to see if it is a phishing website.

However, there are many problems with the current approach because many phishing websites modify their webpage contents by replacing those keywords, such as "XX login", "sign in" and/or "password" and the like, with images, and thus can bypass detection of the text contents. In addition, many phishing websites display login interface by flash, which can also bypass the detection of those login keywords. Accordingly, it would be advantageous to provide a method to detect those phishing websites that cannot be detected by common approaches.

SUMMARY OF THE DISCLOSURE

To solve the problems with the current approaches, the present disclosure provides a method and apparatus to detect phishing websites based on the input information from the user's side.

One embodiment of the present disclosure includes a method for detecting a potential phishing website, comprises obtaining, by a computing device, information input to a website, wherein the computing device comprises at least a processor; determining whether the website is legitimate, wherein the input information comprises private information; continuing to access the website if the website is legitimate; and generating a warning if the website is not legitimate.

Another embodiment discloses a device which comprises at least a processor with circuitry operating in conjunction with at least a memory which stores instruction codes operable as a plurality of modules, wherein the plurality of modules comprise an input monitor module which monitors and obtains information input to a website; a legitimacy determining module which determines whether the website is legitimate wherein the input information comprises private information; and a first processing module which continues to access the website, if the website is legitimate and generate a warning if the website is not legitimate.

Another embodiment discloses a server device comprises at least a processor with circuitry operating in conjunction with at least a memory which stores instruction codes operable as a plurality of modules, wherein the plurality of modules comprise a link obtaining module which receives a query request from a terminal to check security of a website and obtain a link address of the website; and a security checking module which determines the security of the website by checking the link address of the website against a blacklist and a white list, and returns the determination to the terminal, wherein if the link address of the website is present in the white list, the website is determined to be safe; if the link address of the website is present in the blacklist, the website is determined to be unsafe; and if the link address of the website is neither present in the blacklist nor in the white list, the website is determined to be unknown.

Other features and advantages will be, or will become, apparent to one skilled in the art upon examination of the following figures and detailed description. It is intended that all such additional features and advantages included within this description be within the scope of the claims, and be protected by the following claims.

The embodiments of the present disclosure can obtain the information entered by the user, detect the legitimacy of the website when the website requires user's account and login information, or other private information. With the embodiments of the present disclosure, no matter how a phishing website modifies its webpage contents by replacing keywords with images, it would be detected because, in the end, it is the user who need enter the private information such as account information etc. The present disclosure can thus comprehensively and effectively detect phishing websites.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims. Apparently, the drawings described below only are certain embodiments of the present disclosure, the skilled in the art can obtain other drawings based on these drawings without creative work.

DETAILED DESCRIPTION OF THE EMBODIMENTS

The various embodiments of the present disclosure are further described in details in combination with accompanying drawings and embodiments below. Like numbered elements in the same or different drawings perform equivalent functions. It should be understood that the specific embodiments described here are used only to explain the present disclosure, and are not intended to limit the present disclosure.

When describing a particular example, the example may include a particular feature, structure, or characteristic, but every example may not necessarily include the particular feature, structure or characteristic. This should not be taken as a suggestion or implication that the features, structure or characteristics of two or more examples, or aspects of the examples, should not or could not be combined, except when such a combination is explicitly excluded.

For the present disclosure, the method in some embodiments can be implemented in a server and a client/user terminal. Alternatively, some steps of the method in some embodiments can be performed in a server while other steps of the method can be performed in a client/user terminal. Similarly, a device in some embodiments can be a server and a client/user terminal. Alternatively, parts of the device in some embodiments can be integrated in a server while other parts of the device can be integrated in a client/user terminal. A client or user terminal can include, but not limited to, a mobile phone, a tablet computer, an e-book reader, a MP3 player (Moving Picture Experts Group Audio Layer III), a MP4 player (Moving Picture Experts Group Audio Layer IV), a laptop, a desktop PC and so on.

In some embodiments, a method for detecting a potential phishing website or a phishing web page includes the following steps: obtaining information input to a website, by a computing device comprises at least a processor; determining whether the website is legitimate, wherein the input information comprises private information; continuing to access the website if the website is legitimate; and generating a warning if the website is not legitimate. For the purpose of the present disclosure, website and web page when referred in detecting a potential phishing website or a phishing web page are interchangeable.

Figure 1:
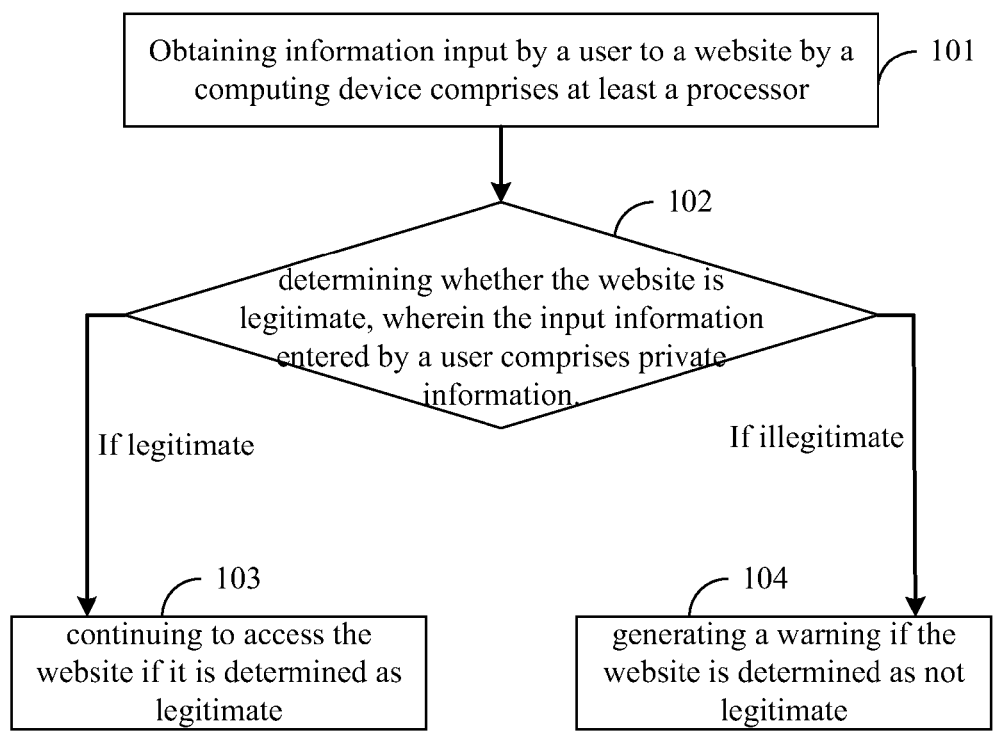
FIG. 1 is a flowchart of a method for detecting a potential phishing website according to an embodiment of the present disclosure.

As shown in FIG. 1, in some embodiments, the method may include the following exemplary steps:

Step 101: obtaining information input by a user to a website by a computing device comprises at least a processor.

In some embodiments, this step can be done by monitoring a user's input information, for example, through monitoring keyboard's input. In some embodiments, this can also be done by hooking an application program Interface (API), or other approaches to monitor a user's input information.

In some embodiments, to improve the efficiency of detection and enhance the detection results, prior to the step of obtaining information input by a user to the website, the method may include first run a preliminary security check on the website to be visited. In these embodiments, only when the security of the website is unknown after the preliminary security check does the computing device perform the step of obtaining information input by a user to the website.

To illustrate, for example, prior to the step of "obtaining information input by a user to a website by a computing device comprises at least a processor (Step 101)," the method for detecting a potential phishing website can also include the following steps: obtaining a link address of the website or webpage to which the user wants to access; checking the link address against a blacklist and a white list; if the link address is present in the white list, continuing to access the website; if the link address is present in the blacklist, blocking the website; and if the link address is neither present in the blacklist nor in the white list, determining the website as an unknown website.

In some embodiments, the link address can be Uniform Resource Locator (URL) link, or an IP address and the like. In some embodiments, these steps for a preliminary security check on the website can be done in a server. For example, the computing device can send a security check request to a server where the preliminary security check is performed.

In some embodiments, the security check against the blacklist and/or white list database can be performed as follows: checking the link address of the website against a blacklist and/or a white list; determining the website as unsafe if the link address is present in the blacklist, or determining the website as safe if the link address is present in the white list; determining the website as unknown if the link address is present neither in the blacklist nor in the white list.

Here, a white list is a list of entities that are known to be non-malicious. For example, IP addresses of known companies and/or institution may be put on a white list to prevent false positives with respect to these companies and entities. A black list is a list or database of the IP addresses or ULR addresses of those malicious websites. Both the blacklist and the white list can be stored in the local device or in a remote server or cloud server. Furthermore, the blacklist and the white list can be updated in real time according to network status. For example, in some embodiments, the step of "checking the link address of the website against a blacklist and/or a white list" can be performed as follows: checking the link address of the website against a blacklist and/or a white list through a remote cloud searching.

Step 102: determining whether the website is legitimate, wherein the input information entered by a user comprises private information. Step 103 will be performed if the website to be visited is determined as legitimate; otherwise Step 104 will be performed if the website to be visited is determined as illegitimate.

For purposes of the present disclosure, the private information may include, but not limited to, users' account names, usernames, credit card numbers, passwords, social security numbers, security questions and answers to security questions, and the like.

In some embodiments, the computing device may collect some private information which is used to determine whether the input information have the private information. This can be done by monitoring a user's input information at those secure or trusted websites, for example, through monitoring keyboard's input or by hooking an application program Interface (API), or other approaches to monitor a user's input information. In some embodiments, there may be a control panel or a setting where a user can select what type of private information he or she wants to protect. In other words, the user can decide which portion of the private information to be utilized to determine whether the input information entered to the website includes private information or not. In some embodiments, the collected private information may also be updated periodically depending on the user's setting.

In some embodiments, whether the website is legitimate when the input information comprises private information can be determined by checking whether there is a digital certificate associated with the website. For example, the step of the determining of whether the website is legitimate by checking whether there is a digital certificate associated with the website, can include checking whether there is a digital certificate associated with the website. If there is one, determining the website is legitimate and go to Step 103; if there is not a digital certificate, determining the website is illegitimate and go to Step 104.

Step 103: continuing to access the website if it is determined as legitimate;

Step 104: generating a warning if the website is determined as not legitimate. In some embodiments, the warning may be a warning or notice to the user that the security of the website or webpage the user is trying to visit is unknown, malicious, or illegitimate. With such warning, the user can then decide whether to continue to access the website or not.

In addition, in some embodiments, the link address and/or IP address of the website which is determined to be illegitimate can be added into the blacklist. For example, the URL address and/or the IP address of the phishing website can be reported by the computing device to the server, so that the server can add the website to the blacklist. Alternatively, the URL address and/or the IP address of the phishing website can also be saved locally. By doing this, the security check for this website can be done by just checking against the blacklist and whitelist, no separate steps for security check is needed. Preferably, if the website is illegitimate, all the webpages contained in the websites may also be determined as illegitimate. Therefore, in some embodiments, link addresses of these webpages can also be added into the blacklist.

As described above, the method for detecting a potential phishing website provided by the present disclosure can comprehensively and effectively detect the web page so as to identify fraudulent account web pages.

Figure 2A:
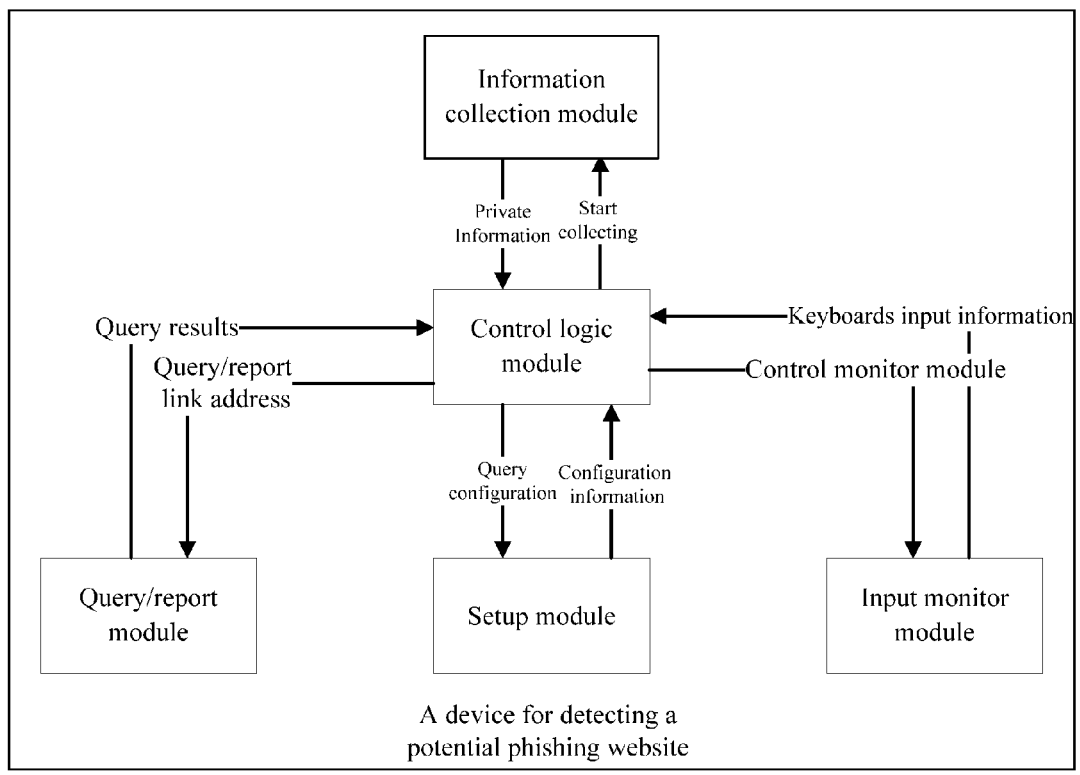
FIG. 2a is schematic view of a device for detecting a potential phishing website according to an embodiment of the present disclosure.

In other embodiments of the present disclosure, as shown in FIG. 2a, a device for detecting potential phishing websites may include at least a processor with circuitry operating in conjunction with at least a memory which stores instruction codes operable as a plurality of modules. The plurality of modules may include an information collection module, an input monitor module, a query and/or report module and a control logic module. In some embodiments, the device can further include a setup module. In some embodiments, the specific functions for each of these modules can be described as follows.

(1) Information Collection Module;

The information collection module is used to monitor and collect the private information wherein the private information is used to determine whether the input information comprises the private information. In some embodiments, the information collection module can be integrated into the user/client terminal to collect the private information that is available in the current user system under the control of the control logic module, such as user names, email addresses, and information like these that was entered in the computing device. Preferably, this private information can be stored locally without being sending to the server where the security check is performed. Thus, the privacy of the users can be protected.

Figure 2B:
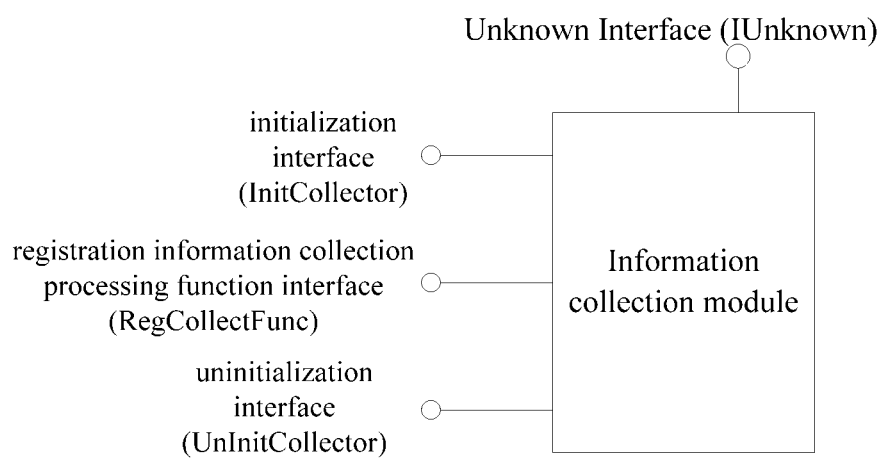
FIG. 2b is a block diagram of the information collection module in the device according to an embodiment of the present disclosure.

As shown in FIG. 2b, in some embodiments, there can be multiple interfaces in the information collection module. For example, it can include, but not limited to, one or more of the following: an initialization interface (InitCollector), an uninitialization interface (UnInitCollector) and a registration information collection processing function interface (RegCollectFunc). In some embodiments, the information collection module may also include some other unknown interface (IUnknown), through which the information collection module can collect and update information regularly, and inform the control logic module through certain data structure via the registration information processing function interface.

(2) Input Monitor Module;

The input monitor module monitors and obtains information input to a website. In some embodiments, the input monitor module can be integrated in a client/user terminal, for instance, plugged in a monitoring browser. Under the control of the control logic module, the input monitor module can monitor the input entered by the user in the browser. Then it sends the information entered by users and the link address of the website to the control logic module to determine whether the input information contains some private information.

Figure 2C:
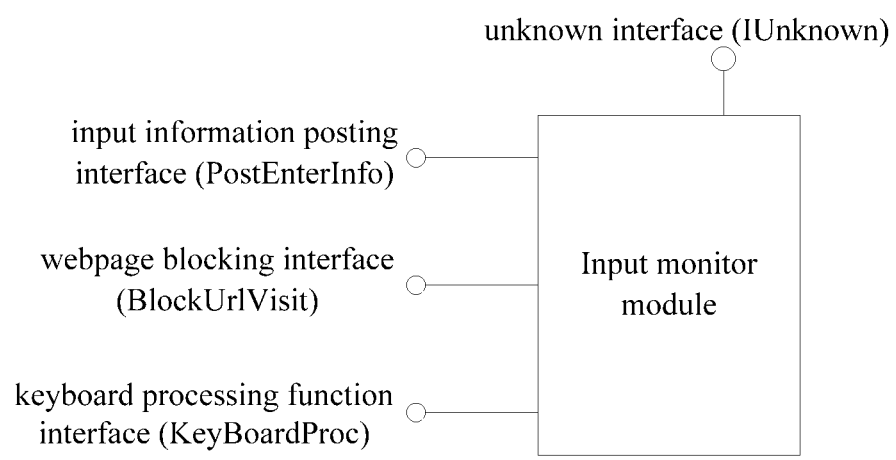
FIG. 2c is a block diagram of the input monitor module in the device according to an embodiment of the present disclosure.

As shown in FIG. 2c, in some embodiments, the input monitor module can also include multiple interfaces. For example, the input monitor module can include, but not limited to, one or more of the following interfaces: a keyboard processing function interface (KeyBoardProc), an input information posting interface (PostEnterInfo), and a webpage blocking interface (BlockUrlVisit). In some embodiments, the input monitor module can also include some other unknown interfaces (Iunknown). Among these interfaces, the keyboard processing function interface can monitor the keyboard input in the browser and obtain the information entered by the user. It can then send the input information to the control logic module through the input information posting interface, and the webpage blocking interface can block the access to the website.

(3) Query/Report Module;

The query/report module sends a link address of the website to a server, wherein the server checks the link address against a blacklist and a white list. In some embodiments, the query module can be integrated in a client terminal or user terminal, and its main function is network communication. For example, under the control of the control logic module, the query module can be used to send the link address of the website, such as URL or IP addresses, etc., to the server for inquiry. The inquiry may include a security check of the website, legitimacy of the website and the like. The query/report module can also report the link address of the website to the server if the website has been detected to require private information input.

Figure 2D:
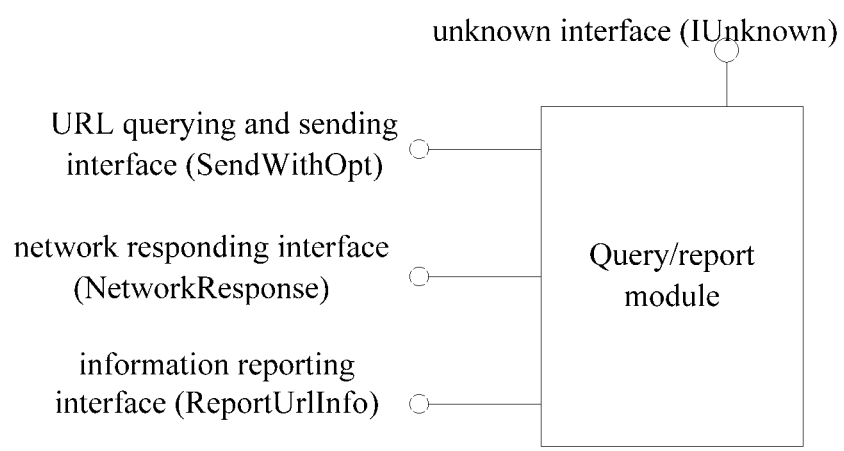
FIG. 2d is a block diagram of the query/report module in the web page detecting devices according to an embodiment of the present disclosure.

As shown in FIG. 2d, in some embodiments, this query/report module can also include multiple interfaces. For example, it can include, but not limited to, one or more of the following interfaces: a URL querying and sending interface (SendWithOpt), a network responding interface (NetworkResponse), and an information reporting interface (ReportUrlInfo). In addition, in some embodiments, it can also include some other unknown interfaces (Iunknown). The URL querying and sending interface can be used to send the link address of the web page, such as URL or IP addresses, etc., to a URL library of the server to check the legitimacy and security of the website. For example, the server can determine if the link address of the website is black, white or grey depending on the security of the website. The server can also check authentication information, the level of credibility of the website and so on. The network responding interface is used to receive the results returned from the server. When the client identify a current web page is the account loading web page and the web page is illegitimate, the information reporting interface can report the linkage of the web page (such as URL) for background detecting server to add the linkage of the web page (such as URL) to the blacklist.

It should be noted that, in some embodiments, the inquiry and report functions can be realized in two modules separately, i.e. a query module and a report module. Alternatively, it can be realized in one module, the nomenclature of the module should not be used to limit the function of the module here. The server can s (4) Setup Module;

The setup module is mainly used to set up the setting for the device for detecting potential phishing websites. For example, in some embodiments, it can receive the configuration information set by the user. The configuration information can include, but not limited to, such as the types of monitoring browser, the strength/level of security protection, the scope of private information to be protected. The setup module can set up the settings in the device according to the received configuration information. In some embodiments, the user can check the configuration information through the setup module, which is flexible to meet the user's personal preferences, and thus increases the flexibility of device.

Figure 2E:
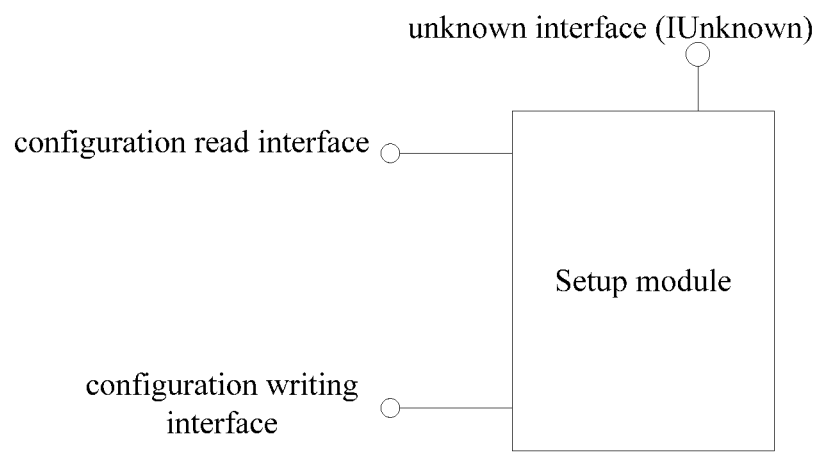
FIG. 2e is a block diagram of the setup module in the device according to an embodiment of the present disclosure.

As shown in FIG. 2e, in some embodiments, the setting module can include more than one interface. For example, it can include a configuration read interface and a configuration writing interface. In some embodiments, it can also include some other unknown (IUnknown) interface. Therein, the configuration read interface is used to receive the user's check query of the set configuration, and the configuration writing interface is used to receive the user configuration information.

(5) Control Logic Module;

The control logic module is mainly used to coordinate work between various modules. For example, in some embodiments, it can control the input monitor module to collect the private information that is available in the current user system, and can receive private information collected by the input monitor module. For example, in some embodiments, it can control keyboard input during monitoring the browser by the input monitor module, and can receive the input information returned by input monitor module, and so on.

Figure 2F:
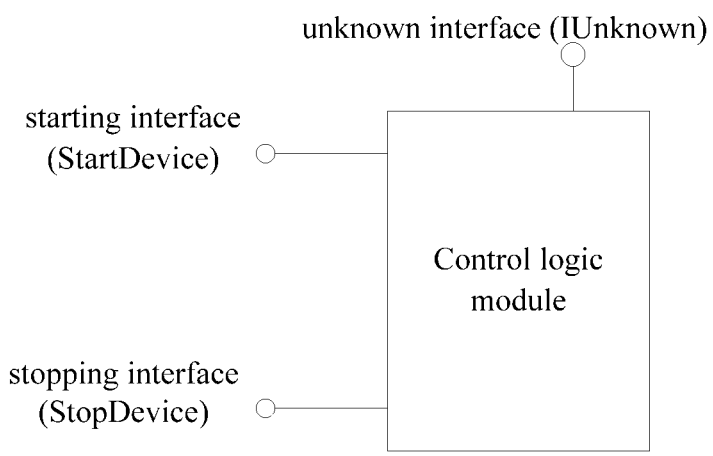
FIG. 2f is a block diagram of the control logic module in the device according to an embodiment of the present disclosure.

As shown in FIG. 2f, in some embodiments, the logical control module can also include more than one interface. For example, it can include a starting interface (StartDevice) and a stopping interface (StopDevice). In some embodiments, it can also include some other unknown (IUnknown) interface. Therein, the starting interface is used to start the phishing website detecting device, and the stopping interface is used to turn off the phishing website detecting device.

Figure 2G:
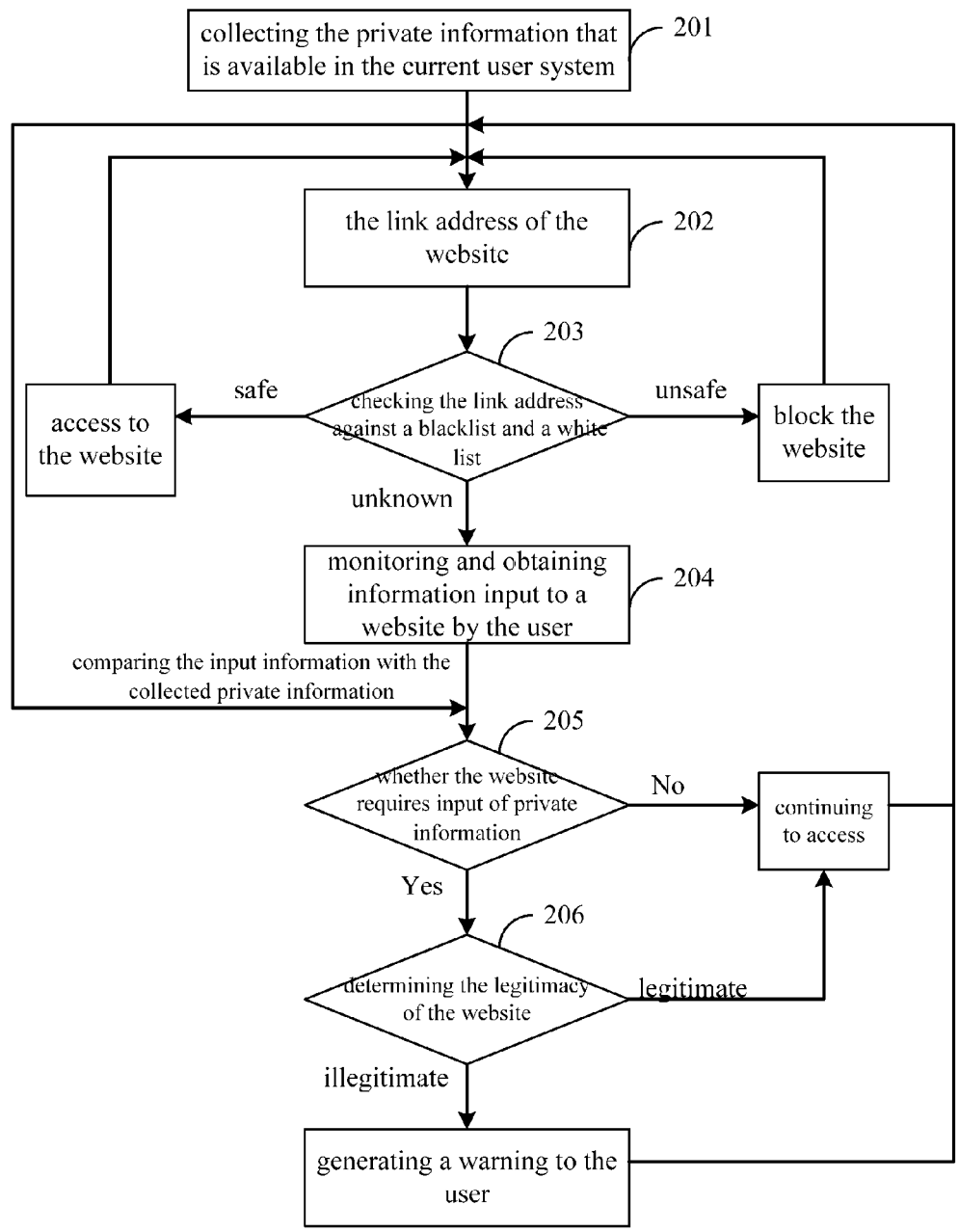
FIG. 2g is a flowchart of a method for detecting a potential phishing website according to another embodiment of the present disclosure.

In some embodiments, as shown in FIG. 2g, the method for detecting a potential phishing website, can include the following steps.

Step 201: The information collection module collects the private information that is available in the current user system under the control of the control logic module, such as user names, email addresses, and information like these that was entered in the computing device, and informs the control logic module through certain data structure via the registration information processing function interface.

Step 202: the input monitor module monitors and obtains information input to a website in the browser and also obtains the link address of the website, and sends the link address to the control logic module.

Step 203: After the control logic module receives the link address of the website from the input monitor module, it will check the link address against a blacklist and a white list; if the link address is present in the white list, it confirms the website is safe and continues to access the website, and in some embodiments return to execute Step 202; if the link address is present in the blacklist, it determines the website is unsafe and intercept and block the website, and return to execute Step 202; and if the link address is neither present in the blacklist nor in the white list, it determines the website as an unknown website, and then execute Step 204.

Here, a white list is a list of entities that are known to be non-malicious. For example, IP addresses of known companies and/or institution may be put on a white list to prevent false positives with respect to these companies and entities. A black list is a list or database of the IP addresses or ULR addresses of those malicious websites. Both the blacklist and the white list can be stored in the local device or in a remote server or cloud server. Furthermore, the blacklist and the white list can be updated in real time according to network status. For example, in some embodiments, the step of "checking the link address of the website against a blacklist and/or a white list" can be performed as follows: checking the link address of the website against a blacklist and/or a white list through a remote cloud searching.

Step 204: the input monitor module monitors and obtains information input to a website by the user, and send the obtained information to the control logic module.

In some embodiments, this step can be done by monitoring a user's input information, for example, through monitoring keyboard's input. In some embodiments, this can also be done by hooking an application program Interface (API), or other approaches to monitor a user's input information.

Step 205: The control logic module compares the obtained input information entered by users with the collected private information in Step 201, and determines whether the website requires input of private information and execute Step 206 if so. If the control logic module determines the website as a legitimate website, the user continues to access the web page. The control logic module may return to execute Step 202.

Step 206: The control logic module can also determine the legitimacy of the website. For example, in some embodiments, it may determine whether there is a digital certificate associated with the website. If yes, it determines the website is legitimate, and allow the device to continue accessing the web page. In some embodiments, it may return to execute Step 202. If there is not a digital certificate associated with the website, it determines the website as illegitimate website, and generates a warning to the user. For example, it can remind the users that the security of the website is unknown, or remind users that the website is illegitimate, etc. In some embodiments, it may also return to execute Step 202. Thus, the user can decide whether to continue to visit the website.

In addition, in some embodiments, the link address and/or IP address of the website which is determined to be illegitimate can be added into the blacklist. For example, the URL address and/or the IP address of the phishing website can be reported by the computing device to the server, so that the server can add the website to the blacklist. Alternatively, the URL address and/or the IP address of the phishing website can also be saved locally. By doing this, the security check for this website can be done by just checking against the blacklist and whitelist, no separate steps for security check is needed. Preferably, if the website is illegitimate, all the webpages contained in the websites may also be determined as illegitimate. Therefore, in some embodiments, link addresses of these webpages can also be added into the blacklist.

Figure 3:
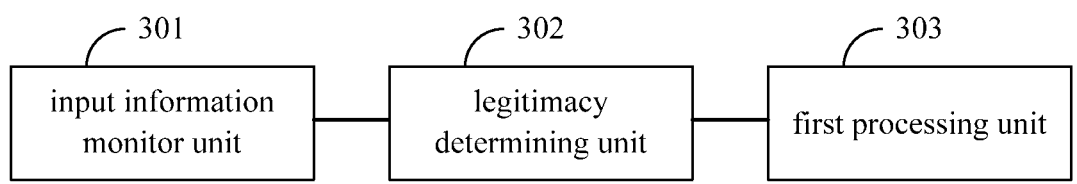
FIG. 3 is a schematic view of the web page detecting devices according to an embodiment of the present disclosure.

In some embodiments of the present disclosure, as shown in FIG. 3, a device for detecting potential phishing websites may include at least a processor with circuitry operating in conjunction with at least a memory which stores instruction codes operable as a plurality of modules. The plurality of modules may include an input information monitor unit 301, a legitimacy determining unit 302, and a first processing unit 303;

The input information monitor unit 301 is used to obtain the information entered on the web page by users; For example, in some embodiments, the information entered on the web page by users can be obtained by monitoring the user's behavior through the client terminal, such as through monitoring keyboard's input. In some embodiments, this can also be done by hooking an application program Interface (API), or other approaches to monitor a user's input information.

The legitimacy determining unit 302 is used to determine the legitimacy of the website, wherein the input information entered by a user comprises private information.

The first processing unit 303 is used to continue to access the website, if the website is legitimate determine by the legitimacy determining unit 302 and generate a warning if the website is not legitimate.

Figure 4:
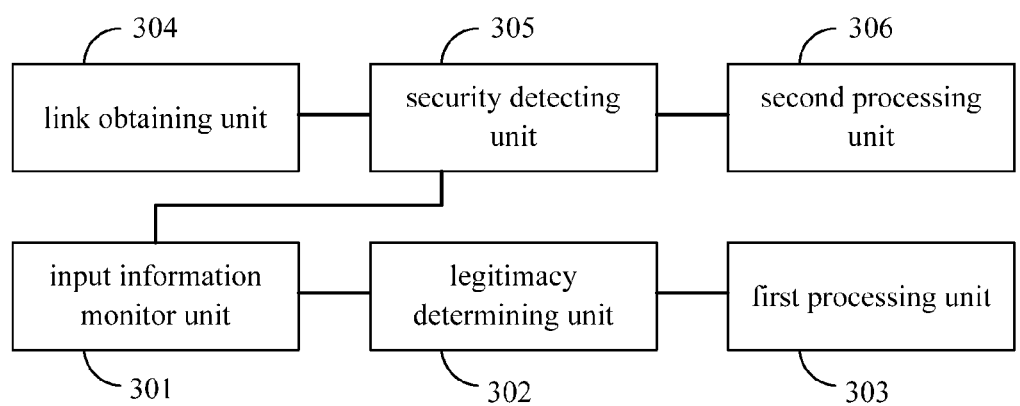
FIG. 4 is a schematic view of a device for detecting a potential phishing website according to another embodiment of the present disclosure.

In some embodiments, whether the website is legitimate when the input information comprises private information can be determined by checking whether there is a digital certificate or qualification associated with the website. For example, the step of the determining of whether the website is legitimate can be performed as follows:

The legitimacy determining unit 302 can be used to confirm whether there is a digital certificate or qualification associated with the website. If there is one, determining the website is legitimate; if there is not a digital certificate, determining the website is illegitimate In some embodiments, to improve the efficiency of detection and enhance the detection results, a preliminary security check on the website can be done before obtaining information input by a user to the website. In these embodiments, only when the security of the website is unknown after the preliminary security check does the computing device perform the step of obtaining information input by a user to the website. As shown in FIG. 4, in some embodiments, a device for detecting potential phishing websites may include at least a processor with circuitry operating in conjunction with at least a memory which stores instruction codes operable as a plurality of modules. The plurality of modules may include a link obtaining unit 304, a security detecting unit 305 and a second processing unit 306.

The link obtaining unit 304 can get a link address of the website which the user needs to get access to, such as the URL link, or an IP address and the like. The security detecting unit 305 can detect the security of the website according to the link address of the website. The second processing unit 306 accesses the website if the website is determined as safe by the security detecting unit 305, or alternatively, blocks the website if the website is determined as unsafe by the security detecting unit 305; or the second processing unit 306 triggers the input information monitor unit 301 to execute the operation of obtaining the information entered on the website by users when the security of the web page is unknown.

Therein the security check for the website can be executed by the security detecting unit 305 according to the preset blacklist or white list, specifically as following: if the link address of the website is present in the white list, the security of the website is safe; if the link address of the website is present in the blacklist, the security of the website is not safe; and if the link address is neither present in the blacklist nor in the white list, the security of the website is unknown.

Here, a white list is a list of entities that are known to be non-malicious. For example, IP addresses of known companies and/or institution may be put on a white list to prevent false positives with respect to these companies and entities. A black list is a list or database of the IP addresses or ULR addresses of those malicious websites. Both the blacklist and the white list can be stored in the local device or in a remote server or cloud server. Furthermore, the blacklist and the white list can be updated in real time according to network status. For example, in some embodiments, the security check for the website can be done through a remote cloud searching.

Preferably, if the website is illegitimate, all the webpages contained in the websites may also be determined as illegitimate. Therefore, in some embodiments, link addresses of these webpages can also be added into the blacklist. For example, in some embodiments, the first processing unit 303 can add the link address of the website and the link addresses of the webpages contained in the website into blacklist when the web page is confirmed illegitimate by the legitimacy determining unit 302.

In some embodiments, the first processing unit 303 can also be used for adding link of the website and the link addresses of the webpages contained in the website into the blacklist when the website is confirmed illegitimate by the legitimacy determining unit 302.

A device for detecting a potential phishing website in some embodiments can be a server and a client/user terminal. Alternatively, parts of the device in some embodiments can be integrated in a server while other parts of the device can be integrated in a client/user terminal. A client or user terminal can include, but not limited to, a mobile phone, a tablet computer, an e-book reader, a MP3 player (Moving Picture Experts Group Audio Layer III), a MP4 player (Moving Picture Experts Group Audio Layer IV), a laptop, a desktop PC and so on.

In some embodiments, for example, each unit above can be implemented as an independent entity, also can be implemented as the same entity or several entities by the any combination of units.

Another embodiment of the present disclosure provides a communication system, which includes a device for detecting potential phishing websites. The device for detecting potential phishing websites is used to obtain information entered on the web page by user. The device determines whether the website is legitimate, when the input information entered by a user comprises private information, similar as the embodiments disclosed previously.

The device for detecting potential phishing websites can also be used to obtain a link address of the website which the user needs to get access to, such as URL of the web page, IP address and so on. Then this device detects the security of the web page according to the link of it. The device allows access to the web page if the security of the website is safe, or ends access to the website if the security of the website is unsafe. Alternatively, the device executes the step of obtaining the information entered on the webpage by users if the security of the website is unknown.

In some embodiments, this communication system can also include some other devices, such as a business server, etc. Therein the business server can provide contents of the webpages to the phishing website detecting device when the detecting device needs to get access to the web page.

Implement of the device above can specifically refer to the preceding embodiments, no repeat here.

Figure 5:
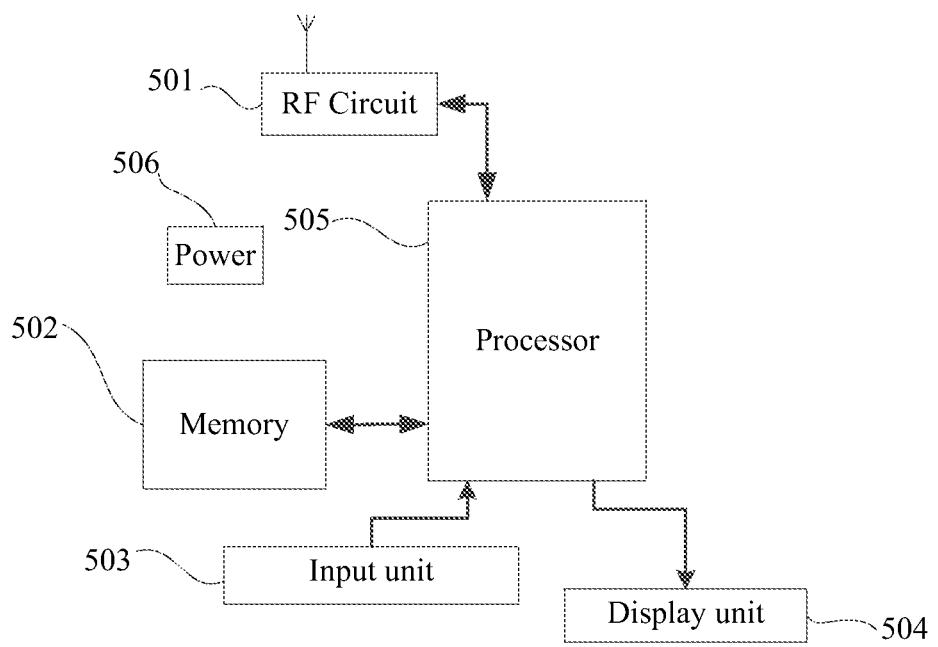
FIG. 5 is a schematic view of a server according to an embodiment of the present disclosure.

According to some embodiments of the present disclosure, as shown in FIG. 5, a server device may comprise a Radio Frequency (RF) Circuit 501, a memory 502 including one or more than one computer readable storage medium, an input unit 503, a display unit 504, a processor 505 with one or more than one processing core and power 506. It should be understood by one of ordinary skill in the art that the server device shown in FIG. 5 does not constitute to the definition limit of the claimed protection of the server and it can include more or less units or combinations or a different arrangement of parts.

In some embodiments, the Radio Frequency (RF) Circuit 501 can send and receive signals during texting and talking; particularly, after the downlink information are received from the base station, it is handed over to one or more than one processor 505 for processing. In addition, it sends the upstream data related to the base station. In some embodiments, the RF Circuit 501 includes, but not limited to, antenna, at least one amplifier, a tuner, one or more than one oscillator, a Subscriber Identity Module (SIM) card, a transceiver, a coupler, a Low Noise Amplifier (LNA), a duplexer, and the like. In addition, in some embodiments, the RF circuit 501 can also communicate with other equipment through the wireless communication and network. The described wireless communication can employ any standard or agreement including, but not limited to, the Global System for Mobile communication (GSM), General Packet Radio Service (GPRS) and Code Division Multiple Access (CDMA), Wideband Code Division Multiple Access (WCDMA), Long Term Evolution (LTE), email, Short message Service (SMS, Short Messaging Service), etc.

In some embodiments, the Memory 502 can store software programs and modules. The processor 505 can perform a variety of applications and data processing function by running the software program and the modules that are stored in the memory 502. The Memory 502 mainly includes program store area and data storage area. In some embodiments, the program store area can store the operating system and at least one application required by function (such as voice broadcast function and image display function, etc.) and so on. The data storage area can store the data according to the use of the server (such as audio data and the phone book, etc.) and so on. In addition, in some embodiments, the memory 502 can include high speed random access memory and non-volatile memory, such as at least one disk storage devices, a flash memory device, or other volatile solid-state storage devices. The memory 502 can also include memory controller, in order to provide the access to the Memory 502 of the Processor 505 and the input unit 503.

In some embodiments, the input unit 503 can be used to receive the input digital or character information, and generate the signal input related to user settings and control by keyboard, mouse, lever, optical signal or trackball. Specifically, in some exemplary embodiments, the input unit 503 can include touch sensitive surface and other input devices. The touch sensitive surface, also known as a touch screen or touch control plate, can collect the touch performance of the user on or near the surface (for example, the user uses fingers, touch pen and any other suitable object or the attachment perform touch sensitive operations in the touch sensitive area on the surface or near surface), and drive the corresponding connection device according to the preset programs. In some embodiments, the touch sensitive surface can include touch sensitive surface detecting device and touch controller. In these embodiments, touching detecting device can detect the user's touch position, and detect the touch signal, transmit the signal to the touch controller. Then the touch controller receives the information from the touching detecting device, converts it to touch point coordinate and transmits to the processor 505, receives the order, and execute the commands from the processor 505. In addition, in some embodiments, the touch sensitive surface can be created by a variety of manners such as resistive, capacitive, infrared, and surface acoustic wave. Besides touch sensitive surface, the input unit 503 can also include other input devices. In some embodiments, other input devices can include, but not limited to, one or more of the following: physical keyboard, function keys, such as volume control button and switch button, etc.), trackball, mouse and operating lever.

In some embodiments, the display unit 504 can be used to display the information input by the user, or information provided to the user and the graphical user interface of the server. The graphical user interface can be constituted by graphics, text, icons, video and any arbitrary combination of them. In some embodiments, the display unit 504 can include one or more of the followings: display panels, a Liquid Crystal Display (LCD), an Organic Light Emitting Diode (OLED) and other forms can be used to configure the display panel. Furthermore, touch sensitive surface can cover the surface of display panel. When touch performance is detected on or near the touch sensitive surface, the signal is transmitted to the processor 505 to determine the type of touch events and then the processor 505 can provide the corresponding visual output on the display panels according to the type of touch events. Although in FIG. 5, the touch sensitive surface and the display panel perform the input and output function as two separate parts. But in some exemplary embodiments, the touch sensitive display panel and the surface can be integrated to perform the input and output functions.

In some embodiments, the processor 505 is the control center of the server, using a variety of interfaces and wirings to connect each part of the whole mobile phone. It can perform the functions of the terminal and process data by running or executing software procedure and/or modules stored in the memory 502, as well as calling the data stored in the memory 502, to do the overall monitoring of the mobile phone. In some embodiments, the Processor 505 can include one or more than one processing core. Preferably, the processor 505 can be an integrated application processor and modem processors. Therein the application processor mainly deals with the main processor operating system, the user interface and application progress, etc. The modem processor mainly deals with wireless communication. Understandably, the modem processor can be integrated not into the processor 505.

In some embodiments, the server includes the power supply 506 for supplying power to each part (such as a battery). In some embodiments, the power can be connected to the processor 505 logically through the power management system, and therefore it can be realized that a function of management of charge, discharge, and power consumption through the power management system management. The power supply 506 can also include one or more than one direct current or alternating current power supply, recharging system, power supply failure detecting circuit, power supply converter or inverter, the power status indicator and any other arbitrary components.

In some embodiments, although not shown in the figure, the server can also include camera, Bluetooth module, and the like. In the exemplary embodiments, the processor 505 of the server follows the following instructions: loading one or more than one application process corresponding to the executable files into the memory 502, and running the application process stored in the memory 502 by the processor 505 so as to perform various functions.

In some embodiments, the server may also include a memory, and one or more than one program, among which one or more than one stored in the memory. And the configuration is that by one or more than one processor executing one or more than one procedure which contains instructions for the following steps:

obtaining the user's information entered on the webpage, detecting the legitimacy of the web page when it detects some private information according to the information entered on the web page by users; continuing getting access to the web page if the web page is legitimate, or warning the user if the web page is illegitimate.

In some embodiments, for example, whether the web page is legitimate or not can be confirmed by checking the qualification of certification of the website to which the web page belongs, specifically as following: confirming whether the website to which the web page belongs has the qualification of certification or not. If having, confirm the web page is legitimate; if not having, confirm the web page is illegitimate.

In some embodiments, the link address and/or IP address of the website which is determined to be illegitimate can be added into the blacklist. For example, the URL address and/or the IP address of the phishing website can be reported by the computing device to the server, so that the server can add the website to the blacklist. Alternatively, the URL address and/or the IP address of the phishing website can also be saved locally. By doing this, the security check for this website can be done by just checking against the blacklist and whitelist, no separate steps for security check is needed. Preferably, if the website is illegitimate, all the webpages contained in the websites may also be determined as illegitimate. Therefore, in some embodiments, link addresses of these webpages can also be added into the blacklist.

In some embodiments, to improve the efficiency of detection and enhance the detection results, prior to the step of obtaining information input by a user to the website, the method may include first run a preliminary security check on the website to be visited. In these embodiments, only when the security of the website is unknown after the preliminary security check does the computing device perform the step of obtaining information input by a user to the website.

To illustrate, for example, prior to the step of "obtaining information input by a user to a website by a computing device comprises at least a processor (Step 101)," the method for detecting a potential phishing website can also include the following steps: obtaining a link address of the website or webpage to which the user wants to access; checking the link address against a blacklist and a white list; if the link address is present in the white list, continuing to access the website; if the link address is present in the blacklist, blocking the website; and if the link address is neither present in the blacklist nor in the white list, determining the website as an unknown website.

In some embodiments, the security detecting for web page can be executed according to the preset blacklist or white list, specifically as following: checking the link address of the website against a blacklist and/or a white list; determining the website as unsafe if the link address is present in the blacklist, or determining the website as safe if the link address is present in the white list; determining the website as unknown if the link address is present neither in the blacklist nor in the white list.

Implementation of the steps above can specifically refer to the preceding embodiments, no repeat here.

Figure 6:
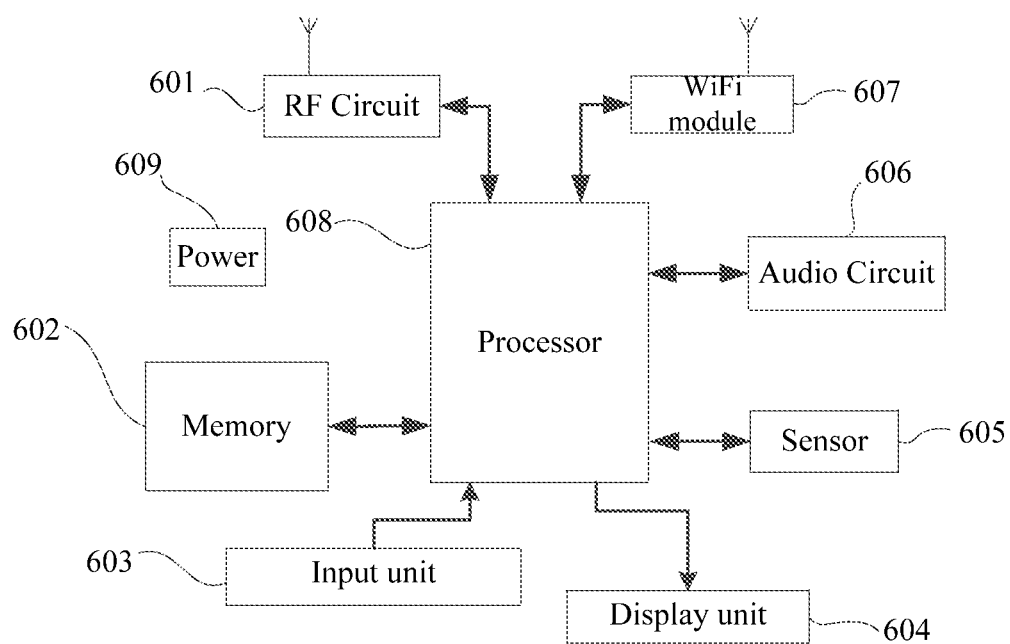
FIG. 6 is schematic view of a terminal according to an embodiment of the present disclosure.

According to some embodiments of the present disclosure, as shown in FIG. 6, a terminal can include a Radio Frequency (RF) Circuit 601, a memory 602 including one or more than one computer readable storage medium, an input unit 603, a display unit 604, a sensor 605, an Audio Circuit 606, a Wireless Fidelity (wi-fi) module 607, a processor 608 with one or more than one processing core and power 609. It can be understood by the persons skilled in the art that the terminal structure shown in FIG. 6 does not constitute to the definition limit of the claimed protection of the terminal and it can include more or less units or combinations or a different arrangement of parts.

In some embodiments, the Radio Frequency (RF) Circuit 601 can be used to send and receive signals during texting and talking Specifically, in some embodiments, after the downlink information are received from the base station, it is handed over to one or more than one processor 608 for processing. In addition, it sends the upstream data related to the base station. In some embodiments, the RF Circuit 601 includes, but is not limited to, antenna, at least one amplifier, a tuner, one or more than one oscillator, a Subscriber Identity Module (SIM) card, a transceiver, a coupler, a Low Noise Amplifier (LNA), a duplexer, and the like. In addition, in some embodiments, the RF circuit 601 can also communicate with other equipment through the wireless communication and network. The described wireless communication can employ any standard or agreement including, but not limited to, the Global System for Mobile communication (GSM), General Packet Radio Service (GPRS) and Code Division Multiple Access (CDMA), Wideband Code Division Multiple Access (WCDMA), Long Term Evolution (LTE), email, Short message Service (SMS, Short Messaging Service), etc.

In some embodiments, the Memory 602 can store software program and module. The processor 608 can perform a variety of applications and data processing function by running the software program and the modules that are stored in the memory 602. The Memory 602 mainly includes program store area and data storage area. In some embodiments, the program store area can store the operating system and at least one application required by function (such as voice broadcast function and image display function, etc.) and so on. Data storage area can store the data created by the use of the terminal (such as audio data and the phone book, etc.) and so on. In addition, in some embodiments, the memory 602 can include a high speed random access memory and a non-volatile memory, such as at least one disk storage devices, flash memory device, or other volatile solid-state storage device. Accordingly, the memory 602 can also include memory controller, in order to provide the access to the memory 602 of the processor 608 and the input unit 603.

In some embodiments, the Input unit 603 can be used to receive the input digital or character information, and generate the signal input related to user settings and control by keyboard, mouse, lever, optical signal or trackball. Specifically, in some exemplary embodiment, the input unit 603 can include touch sensitive surface and other input devices. The touch sensitive surface, also known as a touch screen or touch control plate, can collect the touch performance of the user on or near the surface (for example, the user use fingers, touch pen and any other suitable object or the attachment perform touch sensitive operations in the touch sensitive area on the surface or near surface), and drive the corresponding connection device according to the preset programs. In some embodiments, the touch sensitive surface can include touch sensitive surface detecting device and touch controller. Therein touching detecting device can detect the user's touch position, and detect the touch signal, transmit the signal to the touch controller. Then the touch controller receives the information from the touching detecting device, converts it to touch point coordinate and transmits to the processor 608, receives the order and execute the commands from the processor 608. In addition, in some embodiments, the touch sensitive surface can be created by a variety of manners such as resistive, capacitive, infrared, and surface acoustic wave. Besides touch sensitive surface, input unit 603 can also include other input devices. Specifically, in some embodiments, other input devices can include, but not limited to, one or more of the following: a keyboard, function keys, such as a volume control button and a switch button, etc.), trackball, mouse and operating lever.

In some embodiments, the Display unit 604 can be used to display the information input by the user, or information provided to the user and the graphical user interface of the terminal. The graphical user interface can be constituted by graphics, text, icons, video and any arbitrary combination of them. In some embodiments, the Display unit 604 can include one or more of the followings: display panels and In some embodiments, a Liquid Crystal Display (LCD) and Organic Light Emitting Diode (OLED) and other forms can be used to configure the display panel. Furthermore, touch sensitive surface can cover the surface of display panel. When touch performance is detected on or near the touch sensitive surface, the signal is transmitted to the processor 608 to determine the type of touch events and then the processor 608 can provide the corresponding visual output on the display panels according to the type of touch events. Although in FIG. 6, the touch sensitive surface and the display panel perform the input and output function as two separate parts. But in some exemplary embodiments, the touch sensitive display panel and the surface can be integrated to perform the input and output functions.

In some embodiments, the terminal can also include at least one sensor 605, such as an optical sensor, a motion sensor and other sensors. In particular, the light sensor can include the ambient light sensor and proximity transducer. Therein the ambient light sensor can adjust the brightness of the display panel according to the light and shade of the ambient, and the proximity transducer can shut down the backlight of the display panel when the mobile terminal moved to near the ear. As a motion sensor, an acceleration of gravity sensor can detect the value of the acceleration in all directions (usually three axises); when it is in a still state, it can detect the value and direction of gravity, it can also be used to identify the applications of the state of the mobile phone (for example, switching the direction of the screen between horizontal and vertical, playing relevant game, magnetometer stance calibration), functions related with vibration recognition (such as a pedometer and percussion) and so on. As for the terminal, a gyroscope, a barometer, a hygrometer, a thermometer, an infrared sensor and other sensors could also be configured, no repeat here.

In some embodiments, the Audio circuit 606, speakers, microphones can provide audio interface between the user and the terminal. In some embodiments, the Audio circuit 606 converts the audio data received to electrical signals, transmits it to a speaker and then the sound signal is converted by the speaker and output. The microphone, on the other hand, collects the voice signal and converts it into electrical signal. The audio circuit 606 receives the data and converts it to audio data. After the audio data is output into the processor 608, it is sent to another terminal by the RF circuit 601, or the audio data is output to the memory 602 for further processing. Audio circuit 606 could also include earplug jack, to provide communication between peripheral headphones and the terminal.

In some embodiments, WiFi belongs to the short distance wireless transmission technology. The terminal can help the user send and receive E-mails, browse the webpages and get access to streaming media, etc with the WiFi module 607. It provides the user with wireless broadband Internet access. Although FIG. 6 only shows the WiFi module 607, it should be understood that it is not a necessity of the terminal constitution, i.e. it can be completely omitted without changing the nature of the present disclosure according to the user's need in some embodiments.

In some embodiments, the processor 608 is the control center of the terminal, using a variety of interfaces and wirings to connect each part of the whole mobile phone. It can perform the functions of the terminal and process data by running or executing software procedure and/or modules stored in the memory 602, as well as calling the data stored in the memory 602, to do the overall monitoring of the mobile phone. In some embodiments, the processor 608 can include one or more than one processing core; preferably, the processor 608 can be an integrated application processor and modem processors. Therein the application processor mainly deals with the main processor operating system, the user interface and application progress, etc. The modem processor mainly deals with wireless communication. Understandably, the modem processor can be integrated not into the processor 608.

In some embodiments, the terminal includes the power supply 609 for supplying power to each part (such as a battery). In an exemplary embodiment, the power can be connected to the processor 608 logically through the power management system, and therefore it can be realized that a function of management of charge, discharge, and power consumption through the power management system management. The power supply 609 can also include one or more than one direct current or alternating current power supply, recharging system, power supply failure detecting circuit, power supply converter or inverter, the power status indicator and any other arbitrary components.

In some embodiments, although not shown in the figure, the server can also include camera, Bluetooth module, and the like. In the exemplary embodiments, the terminal processor 608 follows the following instructions: loading one or more than one application process corresponding to the executable files into the memory 602, and running the application process stored in the memory 602 by the processor 608 so as to perform various functions.

Although it is not shown in the figure, in some embodiments, the terminal can also include, but not limited to, camera and Bluetooth module, etc. Specifically described in the exemplary embodiments, the terminal display unit can be a touch-screen displayer. The terminal can also include memory, and one or more than one program, among which one or more than one stored in the memory. And the configuration is that by one or more than one processor executing one or more than one procedure which contains instructions for the following steps:

obtaining information entered by the user on the website, detecting the legitimacy of the website when it detects some private information according to the information entered on the website by users; continuing getting access to the website if the website is legitimate, or warning the user if the website is illegitimate.

For example, whether the web page is legitimate or not can be confirmed by detecting the qualification of certification of the website to which the web page belongs, specifically as following:

In some embodiments, for example, whether the web page is legitimate or not can be confirmed by checking the qualification of certification of the website to which the web page belongs, specifically as following: confirming whether the website to which the web page belongs has the qualification of certification or not. If having, confirm the web page is legitimate; if not having, confirm the web page is illegitimate.

In some embodiments, the link address and/or IP address of the website which is determined to be illegitimate can be added into the blacklist. For example, the URL address and/or the IP address of the phishing website can be reported by the computing device to the server, so that the server can add the website to the blacklist. Alternatively, the URL address and/or the IP address of the phishing website can also be saved locally. By doing this, the security check for this website can be done by just checking against the blacklist and whitelist, no separate steps for security check is needed. Preferably, if the website is illegitimate, all the webpages contained in the websites may also be determined as illegitimate. Therefore, in some embodiments, link addresses of these webpages can also be added into the blacklist.

In some embodiments, to improve the efficiency of detection and enhance the detection results, prior to the step of obtaining information input by a user to the website, the method may include first run a preliminary security check on the website to be visited. In these embodiments, only when the security of the website is unknown after the preliminary security check does the computing device perform the step of obtaining information input by a user to the website.

To illustrate, for example, prior to the step of "obtaining information input by a user to a website by a computing device comprises at least a processor (Step 101)," the method for detecting a potential phishing website can also include the following steps: obtaining a link address of the website or webpage to which the user wants to access; checking the link address against a blacklist and a white list; if the link address is present in the white list, continuing to access the website; if the link address is present in the blacklist, blocking the website; and if the link address is neither present in the blacklist nor in the white list, determining the website as an unknown website.

In some embodiments, the security detecting for web page can be executed according to the preset blacklist or white list, specifically as following: checking the link address of the website against a blacklist and/or a white list; determining the website as unsafe if the link address is present in the blacklist, or determining the website as safe if the link address is present in the white list; determining the website as unknown if the link address is present neither in the blacklist nor in the white list.

Implementation of the steps above can specifically refer to the other embodiments described previously, no repeat here.

As described above, the terminal of this embodiment can obtain the information entered on the web page by the user. Detect the legitimacy of web page when it is confirmed as an account login web page according to the information entered on the web page by the user. Continue getting access to the web page if it is legitimate, or warn the user if the web page is illegitimate. No matter how content of fraudulent account web page changes, finally the user needs to enter account information. Therefore, whether the web page is an account login page or not could be identified through the information entered on the web page by the user. That is to say, the way by the user's behavior of entering information on the web page employed in this embodiment can avoid invalid detecting caused by the modification of the content of the web page by a website. Thus, this method of detecting can comprehensively and effectively detect the web page so as to identify fraudulent account web pages.

It should be understood for a person skilled in the art to accomplish part of or whole steps in the embodiment mentioned above by instructing the related hardware with program. Such program can be stored in a computer-readable storage medium such as Read Only Memory (ROM), Random Access Memory (RAM) Disk or CD, etc.

It must be noted that the smart terminal of the present disclosure is not limited to smart phones, the server device is not limited to personal computer, and the disclosed method is also suitable for operating systems other than Android systems. The server device may be a computer, a tablet, a smart phone, or any computing device. The disclosed methods in the above embodiments may be combined with each other.

The aforesaid preferred embodiment modes may be used in combination. In addition, as used in the present application disclosure, the term "module" or "unit" may refer to include the various software programs object or and/or sets of instructions stored in the memory and to be executed by one or more processors routine executed on the playback progress adjustment apparatus.

Reference throughout this specification to "one embodiment," "an embodiment," "example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

What is claimed is:

1. A method for detecting a potential phishing website, comprising:
   obtaining by a computer device an address information of a website being displayed by a web browser running on the computer device;
   communicating the address information to a remote security server device for conducting a preliminary security check of the address information based on a black and white list of website addresses maintained by the remote security server device; and
   in response to determining by the remote security server device that the address information does not match any of the website addresses on the black and white list:
      obtaining, by the web browser, input information to the website displayed by the web browser via a key stroke detector of the web browser and before the input information is transmitted outside the computer device;
      determining, by the web browser, a match between at least one segment of the information input detected by the key stroke detector and a portion of a set of pre-stored private identification data;
      upon determining the match, further evaluating a legitimacy of the website by determining whether the website is associated with a digital certificate; and
      blocking the web browser from transmitting the input information outside the computer device unless the website is determined to be legitimate.

2. The method of claim 1, wherein the black and white list of website addresses comprises a black list of potentially phishing web sites and a white list of trusted websites.

3. The method of claim 2, further comprising communicating the address information of the website to the remote security server device for inclusion into the black list when it is determined that the website is not legitimate.

4. The method of claim 2, further comprising communicating the address information of the website to the remote security server device for inclusion into the white list when it is determined that the website is legitimate.

5. The method of claim 1, wherein the set of private identification data is pre-stored in a remote data server device.

6. The method of claim 1, wherein the set of private identification data is pre-stored locally in the computer device.

7. The method of claim 1, wherein the set of private identification data comprises one of a phone number, an email address, a credit card number, a password, a user account name, a user name, a social security number, and a security question and answer.

8. The method of claim 1, wherein the set of private identification data is updateable via a user interface from the computer device.

9. A computer device, comprising:
   a memory storing instructions;
   at least one processor in communication with the memory, the at least one processor, when executing the instructions, is configured to cause the computer device to:
      obtain an address information of a website being displayed by a web browser running on the computer device;
      communicate the address information to a remote security server device for conducting a preliminary security check of the address information based on a black and white list of website addresses maintained by the remote security server device; and
      in response to determining by the remote security server device that the address information does not match any of the website addresses on the black and white list:
         obtain input information to the website displayed by the web browser via a key stroke detector of the web browser and before the input information is transmitted outside the computer device;
         determine a match between at least one segment of the information input detected by the key stroke detector and a portion of a set of pre-stored private identification data;
         upon determining the match, further evaluate a legitimacy of the website by determining whether the website is associated with a digital certificate; and
         block the web browser from transmitting the input information outside the computer device unless the website is determined to be legitimate.

10. The computer device of claim 9, wherein the black and white list of website addresses comprises a black list of potentially phishing websites and a white list of trusted websites.

11. The computer device of claim 10, the at least one processor, when executing the instructions, is further configured to cause the computer device to communicate the address information of the website to the remote security server device for inclusion into the black list when it is determined that the website is not legitimate.

12. The computer device of claim 10, the at least one processor, when executing the instructions, is further configured to cause the computer device to communicate the address information of the website to the remote security server device for inclusion into the white list when it is determined that the website is legitimate.

13. The computer device of claim 9, wherein the set of private identification data is pre-stored in a remote data server device.

14. The computer device of claim 9, wherein the set of private identification data is pre-stored locally in the computer device.

15. The computer device of claim 9, wherein the set of private identification data comprises one of a phone number, an email address, a credit card number, a password, a user account name, a user name, a social security number, and a security question and answer.

16. The computer device of claim 9, wherein the set of private identification data is updateable via a user interface from the computer device.

\* \* \* \* \*